US010451936B1

(12) United States Patent
Montgomery et al.

(10) Patent No.: US 10,451,936 B1
(45) Date of Patent: Oct. 22, 2019

(54) THIN TWO-DIMENSIONAL DIMMING BACKLIGHT WITH LOW ZONE VISIBILITY

(71) Applicant: Sharp Kabushiki Kaisha, Osaka (JP)

(72) Inventors: David James Montgomery, Oxford (GB); Hywel Hopkin, Oxford (GB); Jiyun Yu, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/951,297

(22) Filed: Apr. 12, 2018

(51) Int. Cl.
*G02F 1/1347* (2006.01)
*G02F 1/1343* (2006.01)
*F21V 8/00* (2006.01)

(52) U.S. Cl.
CPC ...... *G02F 1/1347* (2013.01); *G02F 1/134336* (2013.01); *G02B 6/0053* (2013.01); *G02B 6/0055* (2013.01); *G02F 2201/122* (2013.01); *G02F 2201/40* (2013.01)

(58) Field of Classification Search
CPC ............... G02F 1/1347; G02F 1/13471; G02F 1/134336; G02F 2201/122; G02F 2201/40; G02B 6/0053; G02B 6/0055
See application file for complete search history.

(56) References Cited

U.S. PATENT DOCUMENTS

| 5,686,979 | A | 11/1997 | Weber et al. |
| 8,199,280 | B2 | 6/2012 | Kim et al. |
| 8,248,555 | B2 | 8/2012 | Senoue et al. |
| 2008/0143907 | A1* | 6/2008 | Kim ................... G02F 1/134336 349/43 |
| 2012/0007896 | A1 | 1/2012 | Kwon et al. |
| 2016/0093255 | A1* | 3/2016 | Aoki ................... G09G 3/3426 345/690 |

FOREIGN PATENT DOCUMENTS

JP 2012129105 7/2012

* cited by examiner

*Primary Examiner* — Nathanael R Briggs
(74) *Attorney, Agent, or Firm* — Renner, Otto, Boisselle & Sklar, LLP

(57) ABSTRACT

A passive matrix display has corrugated electrode edges to reduce zone visibility within a display system. A passive matrix display includes a first substrate and a second substrate; a liquid crystal layer positioned between the first and second substrates; a patterned electrode layer formed on the first substrate comprising a plurality of individual electrodes, wherein adjacent individual electrodes are separated by an electrode gap; and a second electrode layer formed on the second substrate. At least a portion of opposing edges of adjacent individual electrodes at the electrode gap include corrugations. The elements of the corrugations may be any suitable shapes and/or sizes as may be suitable for any particular application. The corrugations may be uniformly shaped or varying, symmetric or asymmetric about a horizontal axis, and/or may have a regular or irregular pattern. Another aspect is a display system including the enhanced passive matrix display that reduces zone visibility.

18 Claims, 6 Drawing Sheets

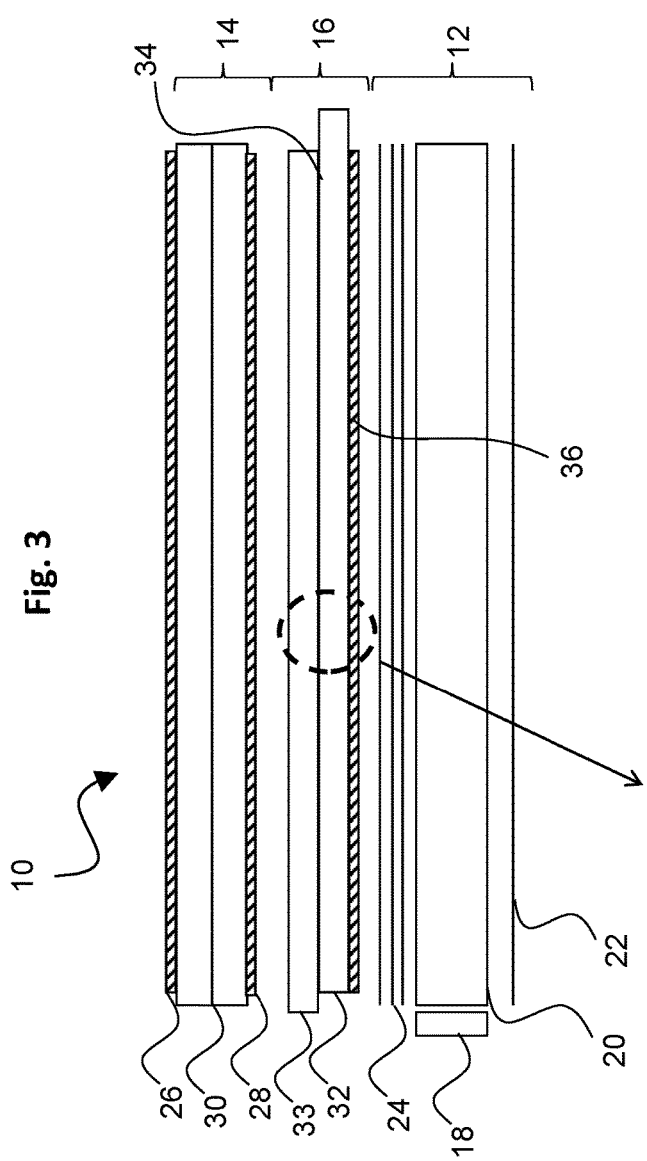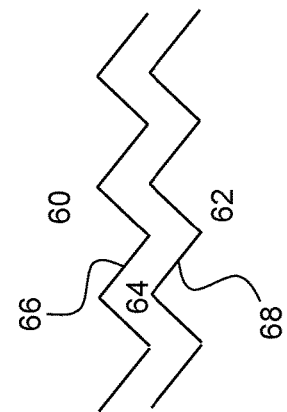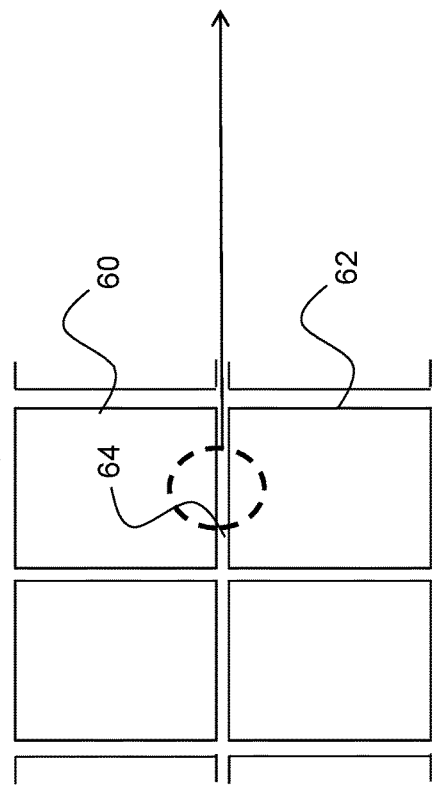

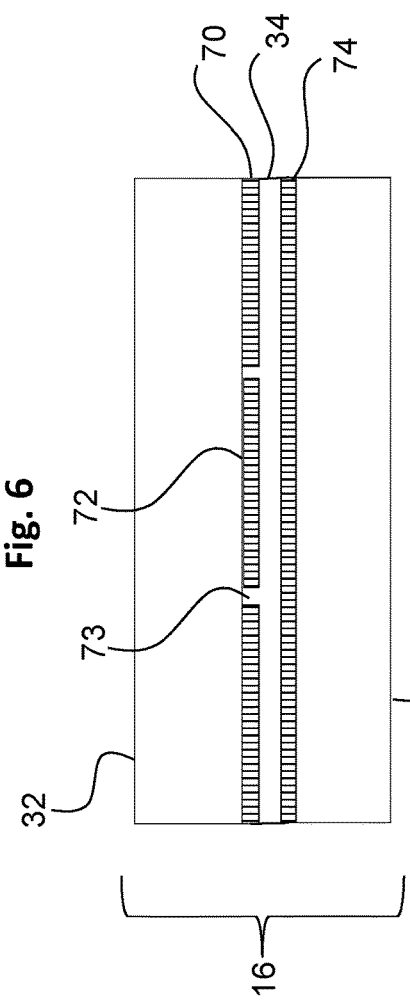
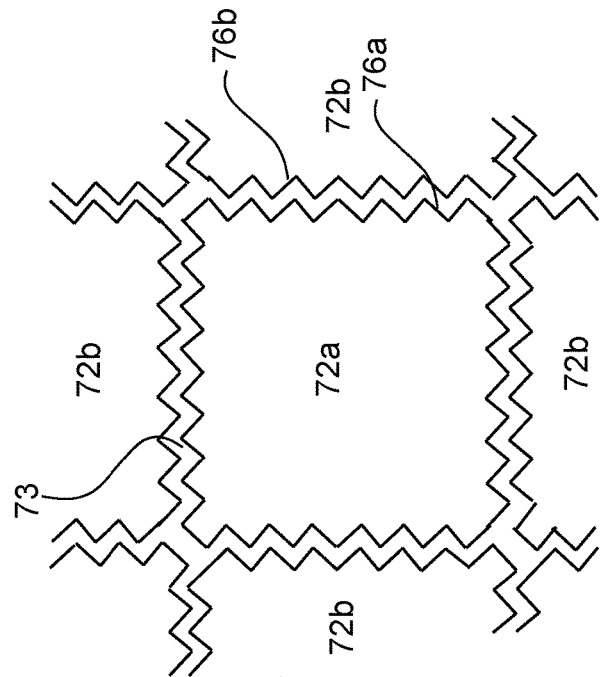
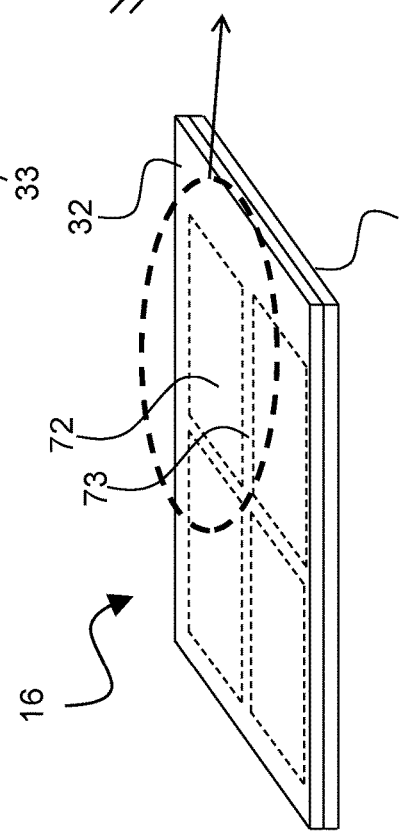

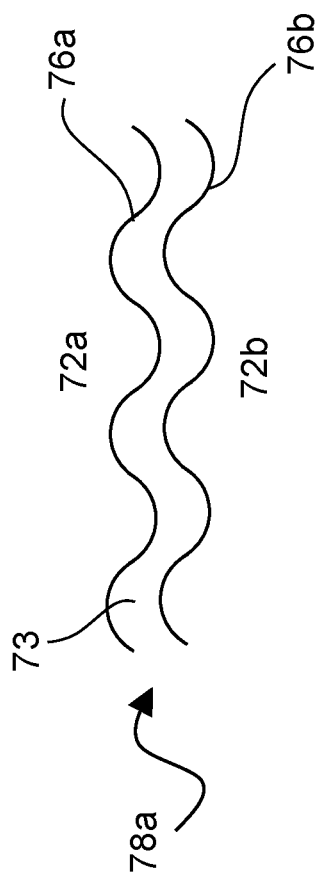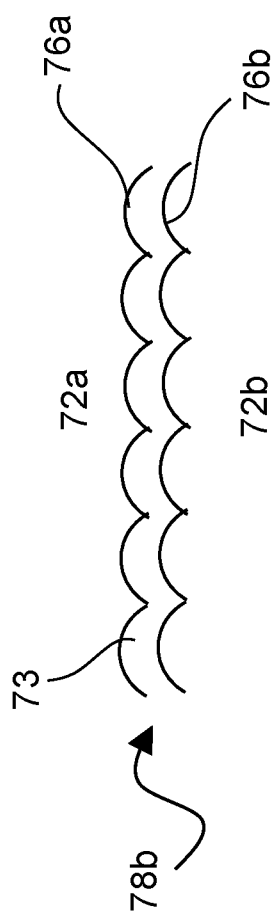

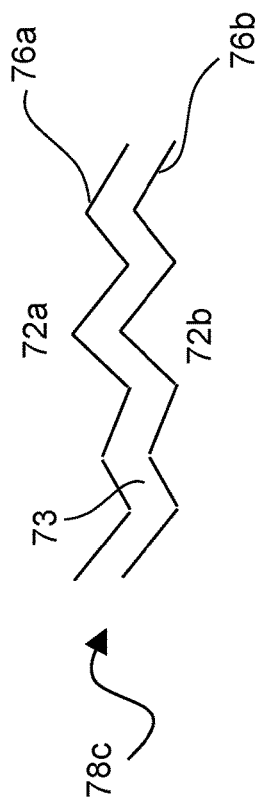
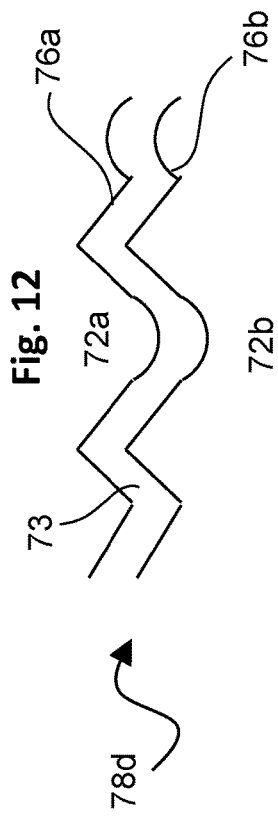
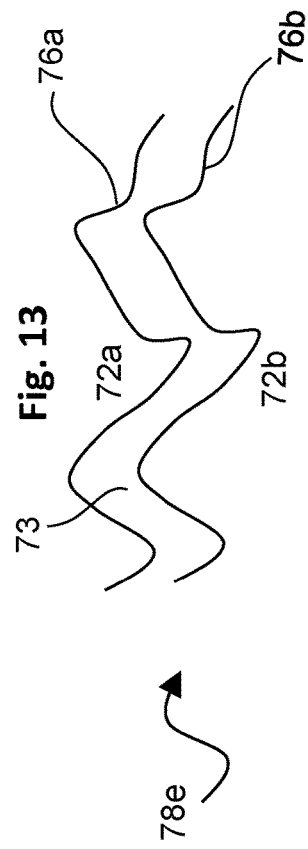

THIN TWO-DIMENSIONAL DIMMING BACKLIGHT WITH LOW ZONE VISIBILITY

TECHNICAL FIELD

The present invention relates to high dynamic range (HDR) displays, and mobile displays in particular, that use a liquid crystal display (LCD) and a lightguide based active dimming backlight incorporating a switchable aperture based local dimming method.

BACKGROUND ART

Methods of achieving two-dimensional (2D) active dimming for televisions and comparable large area displays made up of direct lit light-emitting diodes (LEDs) behind a liquid crystal display (LCD) are known. Miniaturization of active dimming technology to mobile size displays, such as for example smartphones and tablets, involves replacing a lightguide of low thickness with an LED array. In addition, less LEDs are needed than viewing zones required for high quality high dynamic range (HDR) displays. Effective active dimming for mobile displays enhances power management and in particular can extend battery life.

Various attempts have been made to minimize display size in a manner that can be optimized for mobile devices that utilize active dimming. Such attempts have encountered issues, including visibility of zones associated with visible edge patterns of the electrode structures. US 2012/0007896 (Kwon et al., published Jan. 12, 2012) describes the issues with zone visibility in active dimming systems and proposes a method to reduce zone visibility using image processing. As to additional issues associated with minimizing display size, JP 2012129105 (Murata et al., published Jul. 5, 2012) uses optical elements on each direct lit LED to reduce thickness. U.S. Pat. No. 8,199,280 (Kim et al., issued Nov. 26, 2009) attempts to create a thinner direct lit 2D backlight by using individual lightguide elements. U.S. Pat. No. 5,686,979 (Weber et al., issued Nov. 11, 1997) and U.S. Pat. No. 8,248,555 (Senoue et al., issued Aug. 21, 2012) attempt to create a switchable aperture using a second LC panel over the standard backlight.

Effective active dimming with miniaturization generally is not achieved for such devices. Miniaturizing a direct lit, large-display backlight to a mobile size suffers from two principal problems. First, the thickness is substantially reduced which means uniformity is difficult to achieve with a large number of LEDs, and second, the number of LEDs that can be used is less than the number of zones needed. Using lightguides or other optical elements on the LEDs of a direct lit backlight does reduce thickness, but not generally to an extent that can make the backlight mobile. In addition, the use of lightguides or other optical elements does not solve the zone number issue.

Using a second LC aperture (usually a passive matrix LC panel) on a normal backlight produces good quality zones at a low thickness suitable for mobile devices. In such configurations a passive matrix LC and polarizer (or just a reflective polarizer sheet) is placed between the LCD and a normal backlight to create a 2D array of high contrast zones, which can be controlled easily. The number and distribution of zones is then independent of the light source. Conventional configurations, however, encounter a zone visibility problem as referenced above. As the passive matrix LC is immediately behind the main display and separated by a significant thickness, zone edges of the passive matrix LC elements are well defined and sharp, and such edges may be seen in different places on the main display because of parallax between the eyes. This means that the image processing algorithm edge cannot perfectly line up with the LC edge. This results in undesirably generating a rectangular edge pattern that can be seen in the image. The generation of such rectangular edge pattern cannot be corrected well in software; nor is it practical to use a diffuser between the passive matrix LC and the main panel. A diffuser would cause the brightness from the backlight to be significantly reduced.

SUMMARY OF INVENTION

The present disclosure describes display configurations that allow high quality two-dimensional (2D) active dimming that is optimized for mobile size displays, such as may be used for example in smartphones, tablets, and like devices. The present invention solves the thickness and zone count issues described above, while maintaining high efficiency. The described configurations provide an enhanced passive matrix liquid crystal display for effective reduction of zone visibility corresponding to the referenced rectangular edge pattern, by altering the shape of the edges of the electrodes that define the individual zones of the passive matrix display.

In exemplary embodiments, an electrode edge is not made straight, but rather in configured with a corrugation. The corrugation may be formed on at least one side of the electrodes, up to on all sides of the electrodes, depending on the actual zone visibility for a given display. The corrugation preferably should be formed on sets of opposing adjacent electrodes on opposing electrode edges of each respective electrode. The corrugations break up the straight lines that interfere with the straight lines of the main display pixels, which results in the zone visibility corresponding to the electrode edges through the main display being reduced. Opposing adjacent electrodes have a similar shape to maintain the electrode gap. The size of these corrugations can be matched to the parallax error of the eye separation or at a larger level, such as the 40° off-axis parallax error.

An aspect of the invention, therefore, is a passive matrix display having corrugated electrode edges to reduce zone visibility within a display system. In exemplary embodiments, a passive matrix display includes a first substrate and a second substrate; a liquid crystal layer positioned between the first substrate and the second substrate; a patterned electrode layer formed on the first substrate comprising a plurality of individual electrodes, wherein adjacent individual electrodes are separated by an electrode gap; and a second electrode layer formed on the second substrate. At least a portion of opposing edges of adjacent individual electrodes at the electrode gap include corrugations. The elements of the corrugations may be any suitable shapes and/or sizes as may be suitable for any particular application. The corrugations may be uniformly shaped or varying, symmetric or asymmetric about a horizontal axis, and/or may have a regular or irregular pattern.

Another aspect of the invention is a display system including the enhanced passive matrix display that reduces zone visibility. In exemplary embodiments, the display system includes a backlight; a main liquid crystal display; and a passive matrix display according to any of the embodiments located between the backlight and the main liquid crystal display, wherein the backlight is on a non-viewing side and the main liquid crystal display is on a viewing side relative to the passive matrix display. Corrugated electrode edges are provided in the passive matrix display to reduce zone visibility within the display system.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

FIG. 3 is a drawing depicting the display system comparably as in FIG. 1, indicating a portion identified for close-up view.

FIG. 4 is a drawing depicting the close-up view as indicated in FIG. 3, showing an electrode pattern that may be employed in the display system of FIG. 3.

FIG. 5 is a drawing depicting another close-up view as indicated in FIG. 4, showing corrugations on the electrode edges at the boundary of two adjacent electrodes.

FIG. 6 is a drawing depicting a side view of an exemplary configuration of the passive matrix display utilized in the display system of FIGS. 1 and 3.

FIG. 7 is a drawing depicting an isometric view of the exemplary passive matrix display of FIG. 6.

FIG. 8 is a drawing depicting a close-up view as indicated in FIG. 7, showing corrugations on the electrode edges at the boundaries of adjacent electrodes.

FIG. 9 is a drawing depicting a first exemplary variation of the corrugations on the electrode edges.

FIG. 10 is a drawing depicting a second exemplary variation of the corrugations on the electrode edges.

FIG. 11 is a drawing depicting a third exemplary variation of the corrugations on the electrode edges.

FIG. 12 is a drawing depicting a fourth exemplary variation of the corrugations on the electrode edges.

FIG. 13 is a drawing depicting a fifth exemplary variation of the corrugations on the electrode edges.

DESCRIPTION OF EMBODIMENTS

Figure 1:
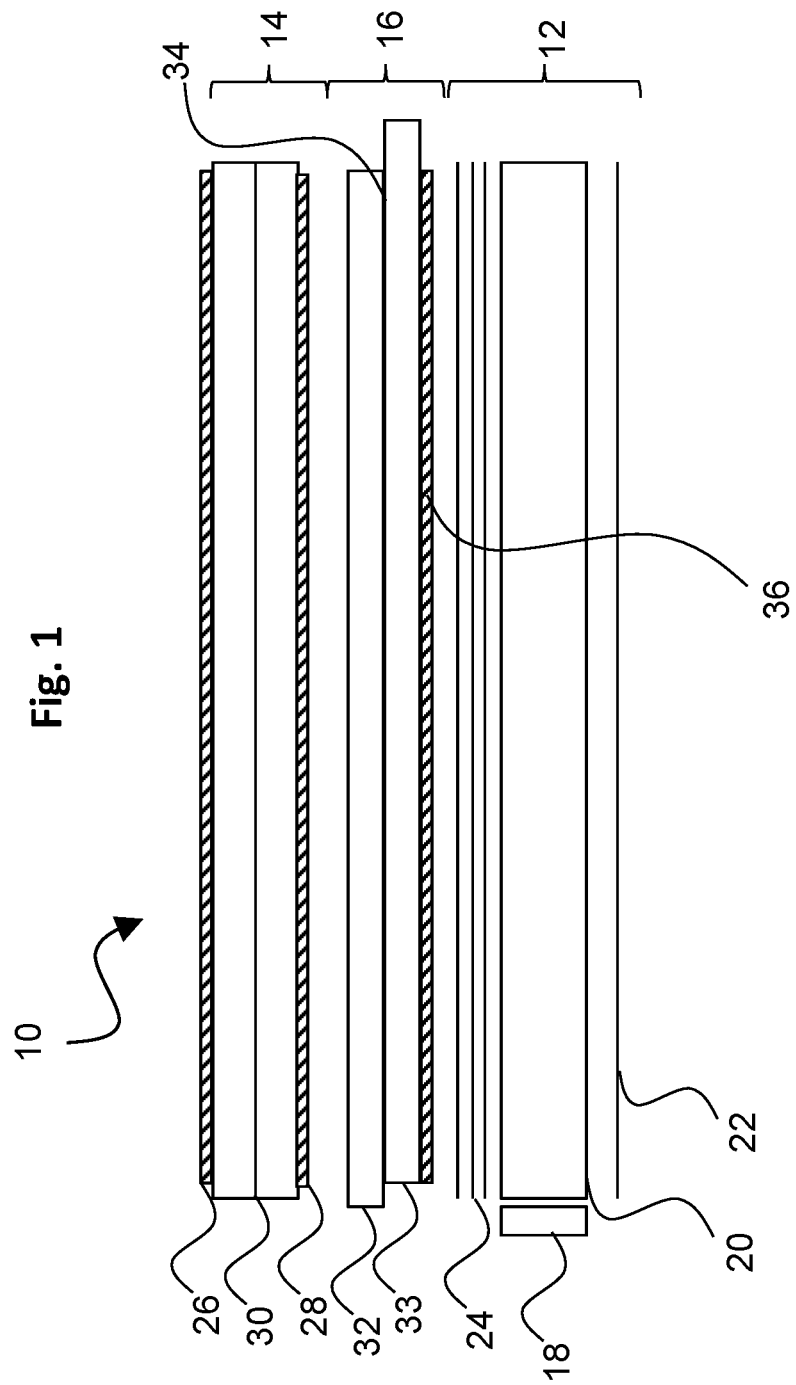
FIG. 1 is a drawing depicting an overview of an exemplary display system that may incorporate the enhanced passive matrix display features of the present invention.

Embodiments of the present invention will now be described with reference to the drawings, wherein like reference numerals are used to refer to like elements throughout. It will be understood that the figures are not necessarily to scale.

Generally, an aspect of the invention is a display system including an enhanced passive matrix display that reduces zone visibility. In exemplary embodiments, the display system includes a backlight; a main liquid crystal display; and a passive matrix display according to any of the embodiments described herein, located between the backlight and the main liquid crystal display. The backlight is on a non-viewing side and the main liquid crystal display is on a viewing side relative to the passive matrix display. As further detailed below, corrugated electrode edges are provided in the passive matrix display to reduce zone visibility within the display system.

FIG. 1 is a drawing depicting an overview of an exemplary display system 10 that may incorporate the enhanced passive matrix display of the present invention. A side view is presented to illustrate the layer components of the display system 10. In exemplary embodiments, the system 10 includes a backlight 12, a main aperture display 14, which for example may be a liquid crystal display (LCD), and a low resolution passive matrix (PM) aperture display 16, located between the backlight 12 and the main aperture display 14. The backlight 12 is on a non-viewing side and the main liquid crystal display 14 is on a viewing side relative to the passive matrix display 16.

In exemplary embodiments, the backlight 12 includes a light source 18 that emits light into an edge of a lightguide 20. The light source 18 may be an array of light-emitting diodes (LEDs) or other suitable light source as is known in the art for use in edge-lit backlights for LCD displays. The lightguide 20 extracts light to be emitted for illumination of the viewing side display layers. The backlight 12 further may include an enhanced specular reflector (ESR) 22 on a non-viewing side of the backlight 12 relative to the lightguide 20 to redirect light toward the opposing viewing side of the backlight. The backlight 12 further may include one or more brightness enhancing films (BEFs) 24 on a viewing side of the backlight 12 relative to the lightguide 20. Typical BEFs for a mobile device may include a diffuser to provide a more uniform distribution of the angled light extracted from the lightguide, and/or a diffusive reflective polarizer or other polarizers, which operate to improve brightness of the display device by collimating light emitted from the backlight 12. It will be appreciated that the various optical components, including any reflectors, diffusers, polarizers, BEFs, and the like may be varied and arranged as is suitable for any particular display device application.

In exemplary embodiments, the main display 14 includes a front polarizer 26 and a rear polarizer 28, with an LCD image panel 30 positioned between the polarizers that includes any suitable substrates, alignment layers, and LC material as are known in the art. In this example, the main display 14 has no color filters nor any black mask. The main display 14 emits images to be viewed by the viewer. The passive matrix (PM) display 16 is located between the backlight 12 and the main display 14.

In exemplary embodiments, the PM display 16 includes a first glass substrate 32 and a second glass substrate 33 sandwiching a PM liquid crystal (LC) layer 34 that is located between the first substrate and the second substrate. On the two internal substrate surfaces are electrodes (not shown in this figure) that can be independently controlled to switch the birefringence, and hence the polarization rotation effect, of the LC layer 34. As further detailed below, the PM display 16 may have a patterned electrode layer formed on the first substrate comprising a plurality of individual electrodes, wherein adjacent individual electrodes are separated by an electrode gap, and a second electrode layer formed on the second substrate. The PM display 16 may be positioned between the rear polarizer 28 of the main display 14 and either another polarizer 36 on the viewing side of the backlight, or another reflective polarizer (e.g. dual brightness enhancement film polarizer or DBEF).

Figure 2:
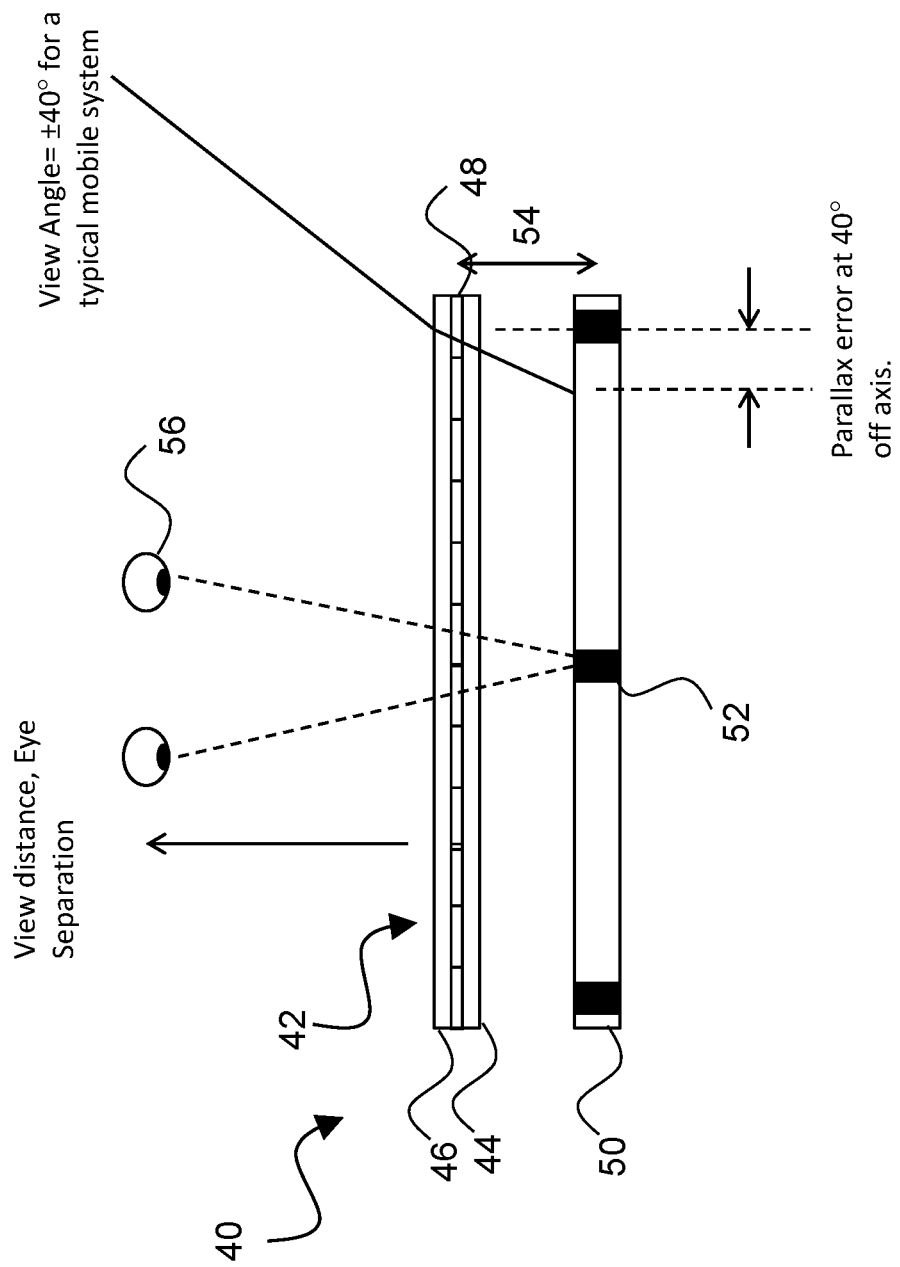
FIG. 2 is a drawing depicting parallax issues that may arise in a conventional display system.

FIG. 2 is a drawing depicting parallax issues that may arise in a conventional display system 40, which may have a configuration comparably as that of FIG. 1. For illustration, the display system 40 includes a main LC image panel 42 having substrate layers 44 and 46 sandwiching an LC pixel layer 48. The main image panel 42 is positioned on a viewing side of a passive matrix (PM) LC panel 50. For the electrodes associated with the display system to be independently controlled, there necessarily must be an electrode gap 52 between the electrodes of the passive matrix panel. As it is not possible to diffuse the light from the backlight as it will reduce the brightness substantially, these gaps 52 may be visible through the pixels of the main image panel 42. The visibility can be difficult to correct in software, because a separation 54 is present between the plane of the pixels 48 of the main display 42, and a plane of the gaps 52. The separation 54 can be significant. With such configuration, the eyes 56 can see the gaps 52 through different pixels, and when viewed off-axis in particular, the alignment of the image zone edge of the main image display and the emitted image is increasingly poor. This results in the edge pattern of the electrodes at the gaps 52 being visible as an artefact in the emitted image, which constitutes the zone visibility problem referenced above.

For example, for a 0.5 mm separation 54 between planes of the PM LC panel 50 and main image display 42, with a refractive index of glass being 1.5 and a viewing distance of approximately 350 mm to 400 mm and eye separation of approximately 62 mm between left and right eyes, there is a shift in viewpoint that causes a parallax error of >50 µm, which is greater than most pixel widths in conventional image displays. If viewed 40° off-axis as illustrated in FIG. 2, the shift in viewpoint (parallax error) is 240 µm for a typical mobile system, corresponding to a substantial number of pixels. This in turn results in zone visibility of a rectangular electrode edge pattern, which generally cannot be corrected in software.

In view of the above, embodiments of the present invention provide an alternative method to reduce this zone visibility corresponding to the referenced rectangular edge pattern, by altering the shape of the edges of the electrodes that define the individual electrode zones. In exemplary embodiments, an electrode edge is not made straight, but rather is configured with a corrugation. The corrugation may be formed on at least one side of the electrodes, up to on all sides of the electrodes, depending on the actual zone visibility for a given display. The corrugations preferably should be formed on sets of opposing adjacent electrodes on opposing electrode edges of each respective adjacent individual electrode. The corrugations break up the straight lines that interfere with the straight lines of the main display pixels, which results in the zone visibility corresponding to the electrode edges through the main display being reduced. Opposing adjacent electrodes have a similar shape to maintain the electrode gap. The size of these corrugations can be matched to the parallax error of the eye separation or at a larger level, such as the 40° off-axis parallax error.

An aspect of the invention, therefore, is a passive matrix display having corrugated electrode edges to reduce zone visibility within a display system. In exemplary embodiments, a passive matrix display includes a first substrate and a second substrate; a liquid crystal layer positioned between the first substrate and the second substrate; a patterned electrode layer formed on the first substrate comprising a plurality of individual electrodes, wherein adjacent individual electrodes are separated by an electrode gap; and a second electrode layer formed on the second substrate. At least a portion of opposing edges of adjacent individual electrodes at the electrode gap include corrugations. As further detailed below, the elements of the corrugations may be any suitable shapes and/or sizes as may be suitable for any particular application. The corrugations may be uniformly shaped or varying, symmetric or asymmetric about a horizontal axis, and/or may have a regular or irregular pattern.

FIG. 3 is a drawing depicting the display system 10 comparably as in FIG. 1, indicating a portion identified for close-up view. FIG. 4 is a drawing depicting the close-up view as indicated in FIG. 3, showing an electrode pattern that may be employed in the display system of FIG. 3. In FIG. 4, each block is illustrative of an individual electrode. For example, therefore, a first electrode 60 and a second electrode 62 are adjacent individual electrodes that are spaced apart by an electrode gap 64.

FIG. 5 is a drawing depicting the close-up view as indicated in FIG. 4, showing corrugations on the electrode edges at the boundary of the two opposing adjacent individual electrodes 60 and 62 at the electrode gap 64. At said boundary, the electrode edges include respective corrugations 66 and 68. In this example, the corrugations are triangular shaped, although other shapes may be employed as further detailed below. Generally, at least a portion of opposing edges of each adjacent individual electrode at the electrode gap includes such corrugations. Opposing adjacent electrode edges have a similar shape, i.e., the corrugations 66 and 68 are matched, to maintain the electrode gap 64. The corrugations operate to provide breaks within the gap 64, which reduces the parallax effect described above. In this manner, the corrugations break up the straight lines that interfere with the straight lines of the main display pixels, which results in the zone visibility corresponding to the electrode edges through the main display being reduced. The zone visibility of the electrode edge pattern is therefore substantially reduced or eliminated.

FIG. 6 is a drawing depicting a side view of an exemplary configuration of the passive matrix (PM) display 16 utilized in the display system of FIGS. 1 and 3. FIG. 7 is a drawing depicting an isometric view of the exemplary PM display 16 of FIG. 6. Such figures illustrate more details of the electrode configurations. As referenced above, the PM display 16 includes a first glass substrate 32 and a second glass substrate 33 sandwiching a PM LC layer 34 that is located between the first and second substrates. On the two internal substrate surfaces are electrodes that can be independently controlled to switch the birefringence, and hence polarization rotation effect, of the LC 34. In this embodiment, the first glass substrate 32 includes a first electrode layer 70 that is patterned into a plurality of individual electrodes 72. The individual electrodes 72 are spaced apart by an electrode gap 73. The second substrate 33 includes a second electrode layer 74 configured as a common electrode that spans the PM matrix display. The first substrate 32 with the patterned electrode layer 70 may be on a viewing side relative to the LC layer 34, and the second substrate 33 with the second electrode layer 74 may be on a non-viewing side of the passive matrix display relative to the LC layer 34.

FIG. 8 is a drawing depicting a close-up view as indicated in FIG. 7, showing corrugations on the electrode edges at the boundary of adjacent individual electrodes 72 within the patterned first electrode layer 70. As shown in this example, a first individual electrode 72a is depicted along with a plurality of adjacent individual electrodes 72b, as separated by the electrode gaps 73. At least a portion of opposing edges of adjacent individual electrodes include opposing corrugations 76a and 76b at the electrode gap 73. In this example as shown in FIG. 8, corrugations 76a and 76b are included on all edges of the individual electrodes 72. Further in this example, the corrugations again are triangular shaped.

As referenced above, the corrugations operate to provide breaks of the electrode gap 73, which reduces the parallax effect described above. In this manner, the zone visibility corresponding to the electrode edge pattern is substantially reduced or eliminated.

It will be appreciated that any suitable shapes and/or patterns may be employed for the elements of the corrugations at the electrode edges, and embodiments are not limited to the triangular configuration depicted in previous figures. Generally, as referenced above, opposing adjacent electrode edges have a similar shape, i.e., the opposing corrugations are matched to maintain the electrode gap. FIGS. 9-13 depict exemplary variations of corrugations 76a and 76b on the electrode edges of adjacent electrodes 72a and 72b at the gap 73, in accordance with the embodiments of the present invention.

In the example of FIG. 9, a circular or elliptical corrugation configuration 78a is shown in which elements of corrugations 76a and 76b have a circular or elliptical shape. In this configuration as well as the triangular configuration above, the corrugations have symmetrical wave-like configurations, i.e., the corrugations 76a and 76b are symmetrical about a horizontal axis in the figures. As an alternative, FIG. 10 depicts an example of a corrugation configuration 78b in which corrugations 76a and 76b are asymmetrical about a horizontal axis. Although FIG. 10 depicts an asymmetrical circular or elliptical configuration, an asymmetrical triangular shape alternatively may be employed.

In previous embodiments, the corrugation elements are all of the same size. As an alternative, FIG. 11 depicts an example of a corrugation configuration 78c in which elements of the corrugations 76a and 76b are different sized elements of a comparable shape. Although FIG. 11 depicts a triangular configuration of different sized triangular elements, different sized circular or elliptical shaped elements alternatively may be employed. In previous embodiments, the corrugation elements are all of the same general shape (e.g. triangular, curved). As an alternative, FIG. 12 depicts an example of a corrugation configuration 78d in which elements of the corrugations 76a and 76b are different shapes. In this example, triangular elements are combined with circular or elliptical shaped elements. Embodiments are not limited to these shapes, as other shapes can be incorporated into a regular pattern. Also, the angled or curved lines do not need to be such, and the corrugation elements may be made up of smaller rectangular steps that follow the curve or angled lines. Embodiments may also include any suitable mix of these shapes or others in a regular repeating manner.

In previous embodiments, the corrugation elements are configured in a regular repeating pattern. As an alternative, FIG. 13 depicts an example of a corrugation configuration 78e in which corrugations 76a and 76b have a random or irregular arrangement. For example, a random shape line of positioning the corrugation elements can be implemented such that a probability that the line is away from a horizontal axis of the corrugations follows a particular probability distribution such as a Poisson, Normal, or Gaussian distribution. This enables an average blur to be applied to the electrode edge to eliminate edge pattern visibility, without affecting the collimation of the backlight light through the image panel, and hence without affecting brightness.

An aspect of the invention, therefore, is a passive matrix display having corrugated electrode edges to reduce zone visibility within a display system. In exemplary embodiments, a passive matrix display includes a first substrate and a second substrate; a liquid crystal layer positioned between the first substrate and the second substrate; a patterned electrode layer formed on the first substrate comprising a plurality of individual electrodes, wherein adjacent individual electrodes are separated by an electrode gap; and a second electrode layer formed on the second substrate. At least a portion of opposing edges of adjacent individual electrodes at the electrode gap include corrugations. The passive matrix display may include one or more of the following features, either individually or in combination.

In an exemplary embodiment of the passive matrix display, the corrugations are included on all edges of the individual electrodes.

In an exemplary embodiment of the passive matrix display, elements of the corrugations have a same shape.

In an exemplary embodiment of the passive matrix display, elements of the corrugations have a same size.

In an exemplary embodiment of the passive matrix display, elements of the corrugations are different shapes.

In an exemplary embodiment of the passive matrix display, elements of the corrugations are different sizes.

In an exemplary embodiment of the passive matrix display, the corrugations are symmetric about a horizontal axis.

In an exemplary embodiment of the passive matrix display, the corrugations are asymmetric about a horizontal axis.

In an exemplary embodiment of the passive matrix display, the corrugations have a regular pattern.

In an exemplary embodiment of the passive matrix display, the corrugations have an irregular pattern.

In an exemplary embodiment of the passive matrix display, a random shape line of positioning of the corrugations is implemented such that a probability that the line is away from a horizontal axis of the corrugations follows a probability distribution comprising one of a Poisson, Normal, or Gaussian distribution.

In an exemplary embodiment of the passive matrix display, the second electrode layer comprises a common electrode.

In an exemplary embodiment of the passive matrix display, the first substrate with the patterned electrode layer is on a viewing side relative to the LC layer, and the second substrate with the second electrode layer is on a non-viewing side relative to the LC layer.

In an exemplary embodiment of the passive matrix display, the LC layer is a pixelated LC layer.

Another aspect of the invention is a display system including the enhanced passive matrix display that reduces zone visibility. In exemplary embodiments, the display system includes a backlight; a main liquid crystal display; and a passive matrix display according to any of the embodiments located between the backlight and the main liquid crystal display, wherein the backlight is on a non-viewing side and the main liquid crystal display is on a viewing side relative to the passive matrix display. Corrugated electrode edges are provided in the passive matrix display to reduce zone visibility within the display system. The display system may include one or more of the following features, either individually or in combination.

In an exemplary embodiment of the display system, the corrugations are included on all edges of the individual electrodes.

In an exemplary embodiment of the display system, the main liquid crystal display includes a front polarizer and a rear polarizer, and the passive matrix display is located between the rear polarizer and the backlight.

In an exemplary embodiment of the display system, the display system further includes another polarizer on a viewing side of the backlight, and the passive matrix display is located between the another polarizer and the rear polarizer of the main liquid crystal display.

In an exemplary embodiment of the display system, the first substrate of the passive matrix display with the patterned electrode layer is on a viewing side relative to the LC layer of the passive matrix display, and the second substrate of the passive matrix display with the second electrode layer is on a non-viewing side of the passive matrix display relative to the LC layer of the passive matrix display.

In an exemplary embodiment of the display system, the LC layer of the passive matrix display is a pixelated LC layer.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

INDUSTRIAL APPLICABILITY

The present invention relates to active dimming of backlight assemblies for display devices. Embodiments of the present invention are applicable to many display devices to permit display devices of high resolution and high image quality. Examples of such devices include televisions, mobile phones, personal digital assistants (PDAs), tablet and laptop computers, desktop monitors, digital cameras, and like devices. The present invention is particularly suitable for active dimming in mobile display devices.

REFERENCE SIGNS LIST

10—display system
12—backlight
14—main aperture display
16—passive matrix (PM) aperture display
18—light source
20—lightguide
22—enhanced specular reflector (ESR)
24—brightness enhancing films (BEFs)
26—front polarizer
28—rear polarizer
30—LCD image panel
32—first glass substrate
33—second glass substrate
34—PM liquid crystal (LC) layer
36—polarizer
40—display system
42—LC image panel
44—first substrate layer
46—second substrate layer
48—LC pixel layer
50—passive matrix (PM) LC panel
52—electrode gap
54—separation
56—eyes
60—first electrode
62—second electrode
64—electrode gap
66—corrugation on first electrode
68—corrugation on second electrode
70—first electrode layer
72—individual electrodes
72a—first individual electrode
72b—adjacent individual electrodes
73—electrode gap
74—second electrode layer
76a—corrugation on first individual electrode
76b—corrugation on adjacent individual electrode
78a—alternative corrugation configuration
78b—alternative corrugation configuration
78c—alternative corrugation configuration
78d—alternative corrugation configuration
78e—alternative corrugation configuration

What is claimed is:

1. A passive matrix display comprising:
a first substrate and a second substrate;
a liquid crystal layer positioned between the first substrate and the second substrate;
a patterned electrode layer formed on the first substrate comprising a plurality of individual electrodes, wherein adjacent individual electrodes are separated by an electrode gap; and
a second electrode layer formed on the second substrate;
wherein at least a portion of opposing edges of adjacent individual electrodes at the electrode gap include corrugations; and
wherein the corrugations are included on all edges of at least a portion of the plurality of the individual electrodes, and corrugations of a first individual electrode tesselate with corrugations of a second adjacent individual electrode along the electrode gap.

2. The passive matrix display of claim 1, wherein elements of the corrugations have a same shape.

3. The passive matrix display of claim 1, wherein elements of the corrugations have a same size.

4. The passive matrix display of claim 1, wherein elements of the corrugations are different shapes.

5. The passive matrix display of claim 1, wherein elements of the corrugations are different sizes.

6. The passive matrix display of claim 1, wherein the corrugations are symmetric about a horizontal axis.

7. The passive matrix display of claim 1, wherein the corrugations are asymmetric about a horizontal axis.

8. The passive matrix display of claim 1, wherein the corrugations have a regular pattern.

9. The passive matrix display of claim 1, wherein the corrugations have an irregular pattern.

10. The passive matrix display of claim 9, wherein a random shape line of positioning of the corrugations is implemented such that a probability that the line is away from a horizontal axis of the corrugations follows a probability distribution comprising one of a Poisson, Normal, or Gaussian distribution.

11. The passive matrix display of claim 1, wherein the second electrode layer comprises a common electrode.

12. The passive matrix display of claim 1, wherein the first substrate with the patterned electrode layer is on a viewing side relative to the LC layer, and the second substrate with the second electrode layer is on a non-viewing side relative to the LC layer.

13. The passive matrix display of claim 1, wherein the LC layer is a pixelated LC layer.

14. A display system comprising:
a backlight,
a main liquid crystal display; and
a passive matrix display located between the backlight and the main liquid crystal display, wherein the backlight is on a non-viewing side and the main liquid crystal display is on a viewing side relative to the passive matrix display;
the passive matrix display comprising:
a first substrate and a second substrate;
a liquid crystal layer positioned between the first substrate and the second substrate;
a patterned electrode layer formed on the first substrate comprising a plurality of individual electrodes, wherein adjacent individual electrodes are separated by an electrode gap; and
a second electrode layer formed on the second substrate;
wherein at least a portion of opposing edges of adjacent individual electrodes at the electrode gap include corrugations; and
wherein the corrugations are included on all edges of at least a portion of the plurality of the individual electrodes, and corrugations of a first individual electrode tesselate with corrugations of a second adjacent individual electrode along the electrode gap.

15. The display system of claim 14, wherein the main liquid crystal display includes a front polarizer and a rear polarizer, and the passive matrix display is located between the rear polarizer and the backlight.

16. The display system of claim 15, further comprising another polarizer on a viewing side of the backlight, and the passive matrix display is located between the another polarizer and the rear polarizer of the main liquid crystal display.

17. The display system of claim 14, wherein the first substrate of the passive matrix display with the patterned electrode layer is on a viewing side relative to the LC layer of the passive matrix display, and the second substrate of the passive matrix display with the second electrode layer is on a non-viewing side of the passive matrix display relative to the LC layer of the passive matrix display.

18. The display system of claim 14, wherein the LC layer of the passive matrix display is a pixelated LC layer.

* * * * *